United States Patent [19]
Riemerschmid

[11] 3,776,467
[45] Dec. 4, 1973

[54] MEANS FOR ACTUATING A MULTIPLE TUBE JET DEFECTOR DEVICE
[75] Inventor: Fritz Riemerschmid, Starnberg, Germany
[73] Assignee: Motorem- und Turbinen-Union Munchen, GmbH, Munich, Germany
[22] Filed: Feb. 25, 1972
[21] Appl. No.: 229,305

[30] Foreign Application Priority Data
Feb. 26, 1971  Germany.................... P 21 09 205.7

[52] U.S. Cl............................... 239/265.35, 60/232
[51] Int. Cl............................................. B64c 15/04
[58] Field of Search................. 239/265.35; 60/232; 244/12 D, 23 D

[56] References Cited
UNITED STATES PATENTS

| | | | |
|---|---|---|---|
| 3,341,229 | 9/1967 | DeWilde..................... | 239/265.35 X |
| 2,933,891 | 4/1960 | Britt................................ | 239/265.35 |
| 3,327,480 | 6/1967 | Gunter....................... | 239/265.35 X |
| 3,480,236 | 11/1969 | Nash........................... | 239/265.35 X |

*Primary Examiner*—Allen N. Knowles
*Assistant Examiner*—John J. Love
*Attorney*—Paul M. Craig, Jr. et al.

[57] ABSTRACT
A multiple tube jet deflector device having two tubes arranged in series downstream of a jet engine fixed inlet pipe. The upstream tube is rotatable connected to the downstream end of the inlet pipe along a first bearing face disposed perpendicularly to the centerline of the inlet pipe. The downstream end of the downstream tube is constructed as an exhaust nozzle. The downstream tube is rotatably connected to the downstream end of the upstream tube along a second bearing face which is inclined relative to the first bearing face such that relative rotation of said tubes effects an angular deflection of the centerline of the downstream tube with respect to the centerline of the inlet pipe. Actuating devices are provided for effecting independent rotation of each of the tubes with respect to the inlet pipe. These actuating devices include ring gears attached to the circumference of the respective tubes and pinions or chain and sprocket arrangements for rotatably driving these ring gears. Actuators are arranged on the circumference of the inlet pipe for driving the pinions or sprockets. A transmission arrangement for coupling the actuator to the pinion or sprocket associated with the downstream tube is rotatably supported on the circumference of the upstream tube by ball bearings or the like. This transmission arrangement includes an annular member including two ring gears disposed about the circumference of the upstream tube. One of these last mentioned ring gears is driven directly by the actuator for the downstream tube while the other is coupled to a universal drive joint which in turn is connected to the pinion or sprocket for driving the ring gears on the downstream tube. A shroud formed by an extension of the upstream tube over the outside of the inlet pipe may be provided for mounting much of the gearing and transmission structure so as to isolate this structure from heat in the gases passing internally of the tubes. An afterburner or reheating means may also be provided in said tubes.

24 Claims, 7 Drawing Figures

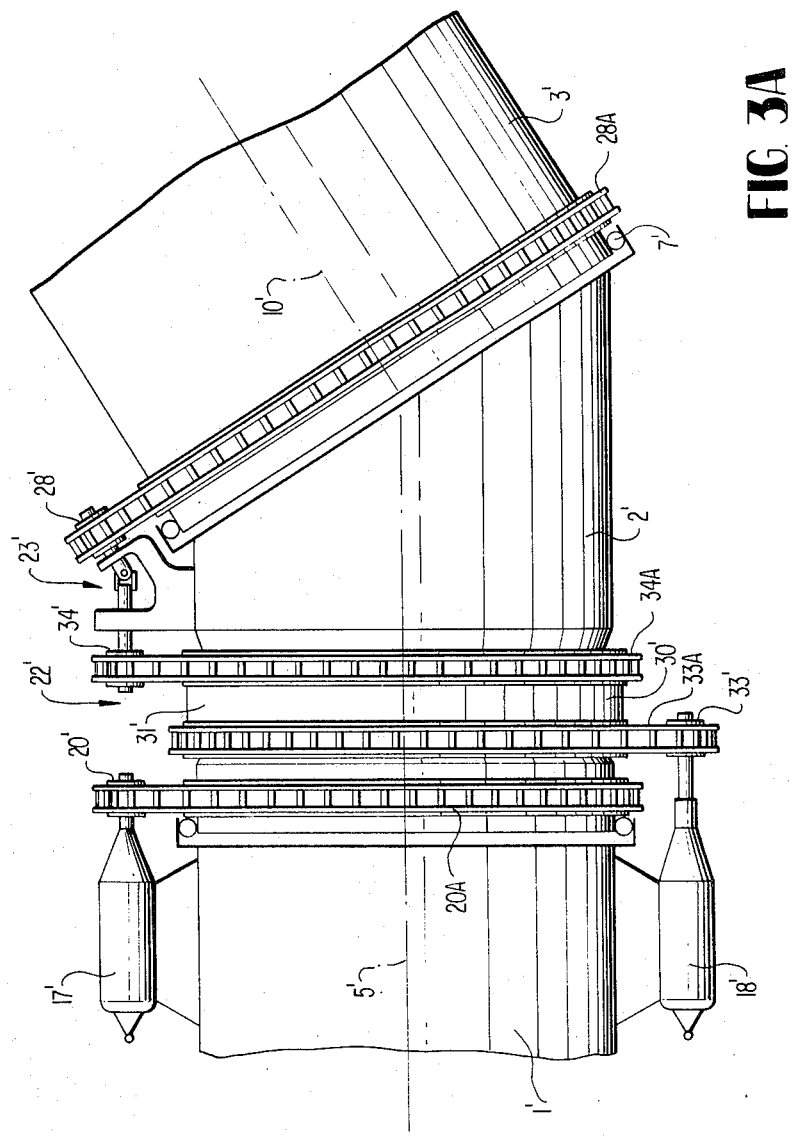

3,776,467

MEANS FOR ACTUATING A MULTIPLE TUBE JET DEFECTOR DEVICE

SUMMARY AND BACKGROUND OF THE INVENTION

The present invention relates to an arrangement for actuating a jet deflector device comprising at least two tubular members interconnected through a rotary bearing and joined to the downstream end of a fixedly mounted inlet pipe for achieving an arbitrarily or continuously three-dimensionally variable angle of jet deflection. Rotational motion of a first tubular member and of a second tubular member is produced by an actuator assigned to either tubular member. One actuator operatively rotates the first tubular member and a second actuator operatively rotates the second tubular member by means of a differential gear arranged at the circumference of the first tubular member and through a transmitting device which is coupled with the differential gear and connected with the first tubular member.

Jet deflector devices consisting of two or more tubular members for simultaneous relative motion have previously been suggested for vectoring the gas jet from an aircraft engine in an aft and down or vertically downward direction for, for example, short or vertical take-off (U.S. Pat. Nos. 2,886,262 or 3,441,220).

The jet deflector devices embraced by these teachings are effectively limited to giving an aircraft no other than horizontal or vertical flight capabilities because the arrangements for vectoring the gas jet operate only in a vertical plane. While fulfilling the described requirement for optional horizontal or vertical flight, or vertical landing, the devices of these teachings will not satisfy the additional requirement for continuously variable selectable exhaust directions of the engine gases for arbitrarily selecting aircraft control maneuvers.

A pivotally mounted spherical nozzle has been proposed where a smaller diameter pipe which has a correspondingly vaulted end and is fitted at its downstream end with a thrust nozzle has been arranged in an axially symmetrically vaulted section of a fixedly mounted jet pipe. Although this arrangement permits arbitrarily selectable vector angles and hence arbitrarily selectable directions of the engine exhaust gases, it is effective over only a very narrowly limited range of angular movement.

This spherical nozzle arrangement also suffers from the inconvenience that the flare inevitably associated with the axially symmetrically vaulted section of the jet pipe must be assumed to be the origin of appreciable flow losses in the engine gas known to fluid engineers also by the term of Carnot's shock losses. For this reason this arrangement will not lend itself to internally ducting and deflecting possibly reheated, i.e., very hot turbojet engine gases, this being a typical instance where unobstructed flow areas are an essential requirement for jet deflector devices.

Another disadvantage of this type of spherical arrangement is the additional design problem of lining the spherically vaulted section of the pivotally mounted portion of the device with a heat shield possibly wetted by cooling air. The use of such a heat shield is practically indispensable especially when the reheat of afterburner burning area is extending aft into the spherically vaulted area to minimize the length of the device.

Also, the spherically vaulted area in this device inevitably involves a comparatively large bulk, so that its installation in the aircraft tail will not exactly be conducive to a slim fuselage tail to give a narrow tail angle for minimum flow losses.

An earlier application (German Pat. application P 20 56 088.7) is directed to eliminating at least some of the apparent disadvantages in the just described spherical nozzle arrangement. The arrangement of this earlier application is directed to ensuring readily accomplish deflection of turbojet engine gases in arbitrarily selectable directions and for arbitrarily selectable aircraft control purposes even for reheated gases. An important feature of this arrangement is the comparatively small volume required for installation. It is further disclosed that the device of that earlier application provides simplicity, robustness and reliability of construction and ensures, when installed in an aircraft tail, a narrow tail angle giving a flow-promoting exterior contour. The disclosure of said application, P 20 56 088.7, is hereby incorporated by reference into this application to the extent necessary for a complete and proper understanding of the present invention.

The device of the above-identified earlier application calls for a comparatively large number of ring gears and pinions meshing therewith in a differential gear arranged at the circumference of the first rotatably mounted tubular member for transmitting rotational motion of the second tubular member. This differential gear is an involved production item, and the comparatively large number of pinions and ring gears is not exactly conducive to satisfy all of the severe reliability requirements imposed on the entire jet deflector device in services, especially considering that the internal ducting of reheated and correspondingly hot gases through the jet deflector device will be the cause of relatively high temperatures with the attendant thermal expansion and stresses in the tubular members and contiguous geared drives.

Another possible drawback in the device of that earlier application is that the intended rotation of only the first tubular member by means of the associated first actuator may also cause rotation of the actuator shaft or output shaft of the second actuator. Consequently, the actuator shafts or output shafts of the actuators may not necessarily return to their original neutral or zero positions which makes the arrangement more difficult to control. The control problems become especially important in systems with an electronic pilot command control device for impressing mutually independent rotational motion on the first and the second tubular member via signals conveyed to their actuators to produce the selected angle of jet deflection, for the reason that the electronic control device may not be able to relate its signals to the address of the regulating elements of the actuators to the original zero positions of the respective actuators.

A general object of this invention is to eliminate the above discussed and other disadvantages of previously proposed arrangements.

The present invention contemplates the provision of a jet deflector arrangement having a relatively fixed inlet pipe arranged upstream of at least two tubular members arranged in series with one of the tubular members rotatably mounted on the downstream end face of the inlet pipe and the other tubular member rotatably mounted to the opposite end of said one tubular member, where the respective bearing faces between the inlet pipe and the one tubular member and between the one tubular member and the other tubular member are inclined relatively to one another, and where actuators are operatively connected to each of said tubular members in such a manner as to independently rotate said tubular members with respect to one another for infinitely variably adjusting the deflection angle of the downstream tubular member with respect to the centerline of the inlet pipe over a predetermined range corresponding to the relative angular displacement of the bearing faces between the respective connections.

The present invention also contemplates the provision of an arrangement for actuating a jet deflector device having a first ring gear mounted on a first tubular member for engagement with a first pinion positively connected with a first actuator, where a single annular carrier is rotatably mounted around the circumference of the first tubular member and comprise second and third ring gears, the second ring gear is intended for engagement with a second pinion positively connected with a second actuator while the third ring gear is intended for engagement with a third pinion positively connected with a transmitting device, where a fourth pinion is connected with a transmitting device on the far side of the differential gear and engages with a fourth ring gear arranged around the circumference of the inlet end of the second tubular member, and where the transmission ratios are the same between the second pinion which is positively connected with the second actuator and the third and fourth pinions which are associated with the transmitting device on the one hand, and between the second and third ring gears and the fourth ring gear on the other.

The present invention also contemplates provisions on the geared drives for rotation of the first and the second tubular members to combat the impact of the temperature resulting from the internal ducting of the hot gases through the jet deflector device. These provisions include extending the first rotatably mounted tubular member at its upstream end in the shape of an essentially cylindrical shroud rotatably disposed around the fixedly mounted inlet pipe by means of ball bearings. With this arrangement, the ring gear for rotation of the first rotatably mounted tubular member, the differential gear and at least a portion of the transmitting device for producing rotation of the second rotatably mounted tubular member are all arranged on the cylindrical shroud.

It is further contemplated in the present invention to adapt the lengths of the first and the second rotatably mounted tubular members to suit the axial extension of the combustion process where a reheating device is used. In this manner, a further advantage is offered by the present invention in that the essential geared drives for transferring rotational motion of the first and the second tubular members can be arranged in the cold section, i.e., on the fixedly mounted gas inlet pipe which is essentially unaffected by reheating It is further contemplated in the present invention to have a modification including sprocket wheel drives in lieu of direct engagement of the pinions with the ring gears for producing rotation of the first and the second tubular members.

Various other advantages and features of the present invention will become apparent from the following detailed description.

BRIEF DESCRIPTION OF THE DRAWINGS

The accompanying Figures illustrate various embodiments of the device assembled in accordance with this invention, in which

FIG. 3A is a view of the jet deflector device similar to the embodiment of FIG. 3 except for the substitution of chain and sprocket drives for the pinion and ring gear drives;

DETAILED DESCRIPTION OF THE DRAWINGS

Figures 1, 2:
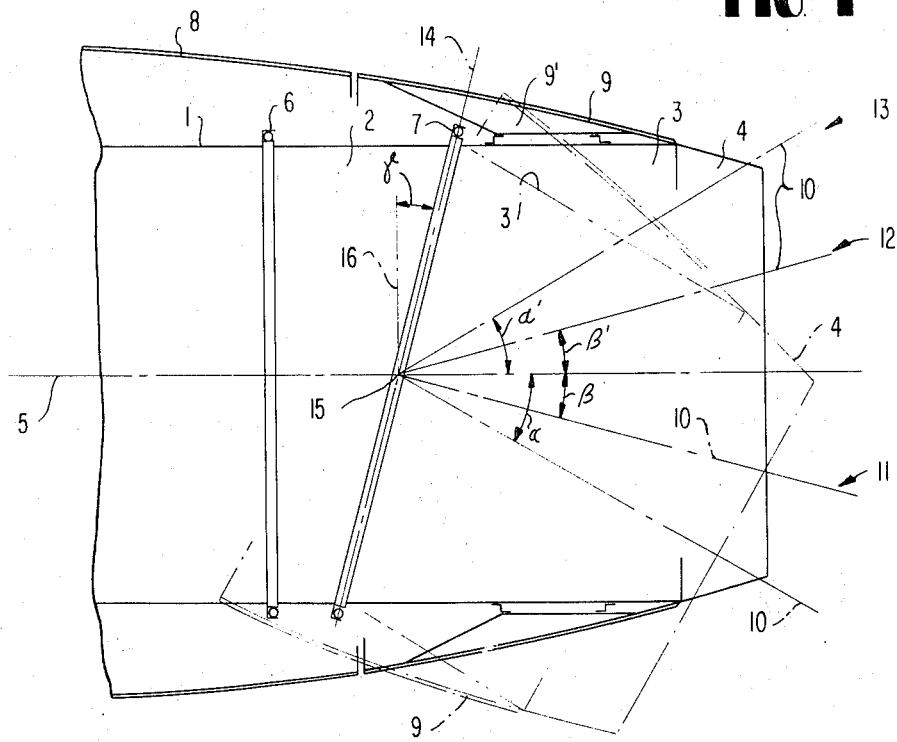
FIG. 1 is a lateral view showing a jet deflector device formed of two tubular members in illustration of various angles of jet deflection.
FIG. 2 is a view of the jet deflector device of FIG. 1 fitted with an actuating device in a first embodiment.

FIG. 1 illustrates broken-away end of an inlet pipe 1 of a turbojet engine, the details of the engine being not shown here for clarity of presentation. Inlet pipe 1 terminates in two tubular members 2 and 3 relatively rotatable with respect to one another. The tubular member 3 carries a variable thrust nozzle 4 at its outlet end. The tubular member 2 is rotatably mounted at the outlet end of the inlet pipe 1 by means of a rotary bearing 6 extending perpendicularly to the produced engine centerline 5. The tubular members 2 and 3 are connected one with the other through a rotary bearing 7 arranged in an inclined position relative to the produced engine centerline 5. An engine cowling 8 forming a part of an aircraft tail is arranged coaxially to the produced engine centerline 5. Cowling 8 extends at its tapered end to form a continued but separate cowling section 9 connected with the tubular member 3 through retaining elements 9'. In the solidly drawn positions of the tubular member 3 and the thrust nozzle 4, which is the most common extreme position for cruise and fast-travel flight, the cowling section 9 forms a flow-promoting extension of the engine cowling 8. However, when the tubular member 3 together with the thrust nozzle 4 is in the dash-lined extreme position to vector the exhaust gas in an aft and down direction, the cowling section 9 which is fixedly connected with the tubular member 3 has lifted off the engine cowling 8 on the upper side and has shifted on the lower side into the free space between the inner wall of the engine cowling 8 on the one hand and the inlet pipe 1 and the member 2 on the other. The dash-marked position of the tubular member 3 and the thrust nozzle 4 characterizes the maximum possible angle of jet deflection between the produced engine centerline 5 and the longitudinal centerline 10 of the tubular member 3 and the thrust nozzle 4. The positions generally indicated by the numerals 11, 12 and 13 (FIG. 1) are indicative of further possible angles of inclination included between the produced engine centerline 5 and the longitudinal centerline 10 common to the tubular member 3 and the thrust nozzle 4. It is to be understood that all intermediate angles in all three dimensions between the angles illustrated can also be attained.

The exemplified angles of inclination $\alpha$, $\alpha'$ and $\beta$, $\beta'$ of the longitudinal centerline 10 can here be assumed to lie in the drawing plane and can hence be achieved by simultaneous oppositely relative rotation of the tubular members 2 and 3 through equal degrees of arc, pivotally moving the tubular member 3 together with the thrust nozzle 4, and with it the gas jet issuing therefrom, in a vertical plane extending through the produced engine centerline 5.

The maximally obtainable jet deflection angle $\alpha$ or $\alpha'$ included between the produced engine centerline 5 and the longitudinal centerline 10 common to the tubular member 3 and the thrust nozzle 4 relates among others to be selected angle of inclination $\gamma$ included between the inclined plane 14 of the rotary bearing 7 and a perpendicular transverse plane 16 extending through a center 15 of the rotary bearing 7 and the produced engine centerline 5, so that the degree of angle $\gamma = \alpha/2$.

At an assumed angle of inclination $\gamma = 15°$, the angle $\alpha$ can be assumed at 30°, and at an assumed angle of inclination $\gamma = 45°$, the angle $\alpha$ can be assumed at 90°, to reach which angle the tubular members 2 and 3 would have to be simultaneously rotated each through 90° in opposite directions from the fully extended or straight cruise position of the device (FIG. 1).

The device of the present invention is further intended to satisfy the requirement for pivotally varying the gas jet three-dimensionally in arbitrarily selected directions in order to obviate, where desirable and where the device is installed in the aircraft tail, conventionally used vertical and horizontal tail surfaces. This requirement inevitably assumes that the gas jet issuing from the engine can be vectored not only in the drawing plane (FIG. 1) but additionally also to the sides of this drawing plane, or at an angle away from the produced engine centerline 5 in a slanting aft and down or aft and up direction. To achieve this three-dimensional control it is contemplated to provide relative oppositely directed rotation of the tubular members 2 and 3 through different degrees of arc by providing an actuating system for the tubular members 2 and 3 (FIG. 2) which employs comparatively simple means to produce mutually discrete rotational movements or angles of rotation between the tubular members 2 and 3.

Actuators 17 and 18 are mounted on the exterior surface of a reheat pipe 1 for providing the discrete or separate rotational control of members 2 and 3. These actuators may be pneumatic, hydraulic, or electric. The actuator 17 drives the first tubular member 2 through a geared drive and a pinion 20 engaging with a ring gear 21 arranged around the inlet end of the tubular member 2. The second actuator 18 essentially drives through a differential gear 22 and a transmitting device 23. Transmitting device 23 is coupled with the differential gear 22 and carried over and past the rotary bearing 7 to the second tubular member 3.

This transmitting device 23 may alternatively be a flexible shaft (not shown on the drawings). In lieu of the flexible shaft, FIG. 2 illustrates a universal type shafting arrangement having a first shaft 24 extending parallelly to the engine centerline 5 and a second shaft 25 extending in a direction to suit the inclination of the plane 14 (FIG. 1) of the rotary bearing 7. For positive connection between the two shafts 24 and 25 a spherical joint or universal joint 26 is used for adaptation to the said inclination of the second shaft 25. Both shafts 24 and 25 are retained and supported in a bearing pedestal 27 externally mounted on the tubular member 2. The ring gear 31 of the annular carrier 30 is intended for engagement with a pinion 33 positively connected with the second actuator 18. The ring gear 32 is intended for engagement with a pinion 34 connected with the first shaft 24 of the transmitting device 23. Bearing 35 are provided for rotatably supporting carrier 30 with respect to tubular member 2. The pinions 33 and 34 on the one hand, and the ring gears 31 and 32 on the other, are the same diameter and have the same number of teeth, so that the transmission ratios between the pinion 33 and ring gear 31 or between the pinion 34 and the ring gear 32 are the same. The transmission ratio between the pinion 28 on the shaft 25 and the ring gear 29 over the inlet end of the second tubular member 3 corresponds to that between the pinions 33, 34 and the ring gears 31, 32. In order to achieve circularity of the rotary bearing 7 at the angles of inclination $\gamma$ as exemplified with reference to FIG. 1 of the plane 14 of this rotary bearing 7, the cross-sections of the tubular members 2 and 3 are made slightly elliptical at least in this bearing area. With this arrangement the ring gear 29 over the inlet end of the tubular member 3 can be given a slightly larger diameter than the ring gear 21 in the inlet end area of the tubular member 2 or than the ring gears 31 and 32 of the differential gear 22 which are expediently supported in the circular cross-secional area of the tubular member 2. When the ring gear 29 is for these reasons given a larger diameter, this will necessitate, inclusive of the pinion 28 of the transmitting device 23, a correspondingly greater number of teeth as are needed to achieve conformity of the transmission ratio to that of the pinions 33 and 34 with the ring gears 31 and 32.

The arrangement and constellation of the differential gear 22 and the transmitting device 23 illustrated in FIG. 2 permits the tubular members 2 and 3 to be simultaneously and jointly rotated through like or different degrees of arc. The tubular members 2 and 3 are equally adjustable in complete independence one of the other, so that when rotation of only the tubular member 3 and standstill of the tubular member 2 is desired and effected, no motion is impressed on the first actuator 17, and likewise when the standstill of the tubular member 3 and rotation of only the tubular member 2 is desired and effected, no motion is impressed on the second actuator 18. Simultaneous rotation of the tubular members 2 and 3 is also possible with no influence being exercised by the movement of the first actuator 17 on that of the second actuator 18, and vice versa.

Figure 3:
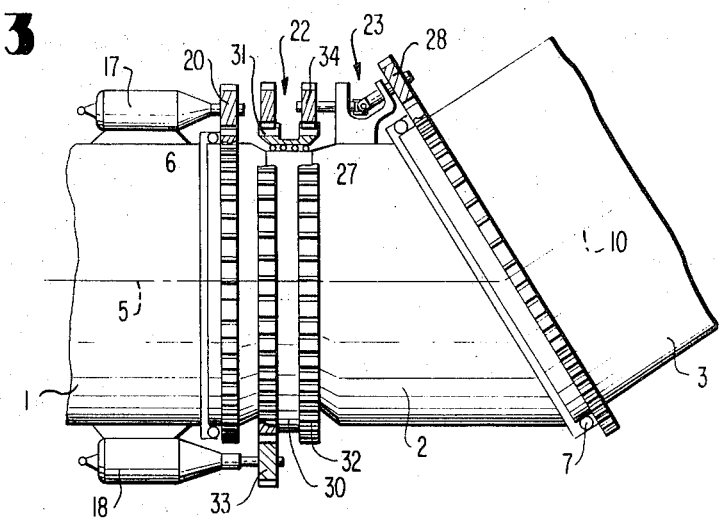
FIG. 3 is a view of the jet deflector device of FIG. 1 fitted with an actuating device in a second embodiment.

The embodiment of FIG. 3 is distinguished over that of FIG. 2 essentially in that the first actuator 17 and the second actuator 18 are both rotated 180° from their original positions on the fixedly mounted inlet pipe 1. With this arrangement, the minimum overall length of the transmitting device 23 is shortened because device 23 is laterally arranged on the tubular member 2 in the area of its shortest lateral flank between the two rotary bearings 6 and 7. Also, the tubular member 3 is here shown in an angular aft and up position. Otherwise the operation of the embodiment of FIG. 3 is identical with that of the embodiments of FIGS. 1 and 2.

Figure 4:
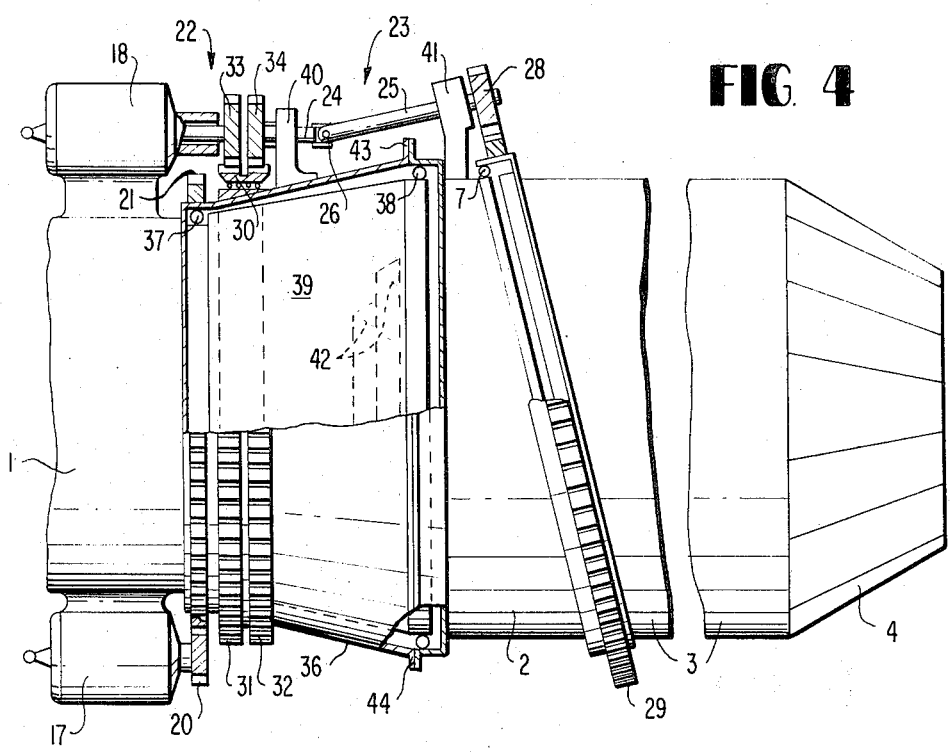
FIG. 4 is a view of the jet deflector device of FIG. 1 fitted with an actuating device in a third embodiment.

The embodiment of FIG. 4 differs from that of FIG. 2 essentially in that the first rotatably mounted tubular member 2 is extended in the upstream direction in the shape of a cylindrical shroud 36 rotatably mounted around a terminal section 39 of the fixedly mounted inlet pipe 1 by means of the ball bearings 37 and 38. FIG. 4 shows the cylindrical shroud 36 having a slight flare towards its downstream end to suit the shape of the terminal section 39.

Arranged on the cylindrical shroud 36 are the ring gear 21 for imparting rotational motion to the tubular member 2, as well as the annular carrier 30 comprising the ring gears 31 and 32, and a bearing pedestal 40 for guiding and retaining the first shaft 24 of the transmitting device 23. A bearing arrangement similar to that shown at 35 in FIGS. 2 and 3 also supports the carrier 30 on the shroud 36. An additional pedestal 41 for retaining and guiding the second shaft 25 of the transmitting device 23 is attached directly to the tubular member 2.

The operation of the device of FIG. 4 as regards arbitrarily selectable rotation of the tubular members 2 and 3 is the same as for the devices of FIGS. 1 and 2. That is, with actuator 18 fixed, rotation of member 2 and associated transmitting device including gear 34 causes a pivotal movement of member 3 and nozzle 4. Also, with actuator 17 fixed, actuator 18 can drivingly rotate member 3 with respect to member 2 to pivotally deflect nozzle 4.

The advantage in the device of FIG. 4 is that the essential components of the differential gear 22 and of the transmitting device 23 are not arranged directly on the tubular member 2 or on the terminal section 39. This arrangement gives optimum protection of the geared drives from the thermal effects caused by the internal ducting of highly heated gases through the jet deflector device.

A further advantage of the embodiment of FIG. 4 is apparent especially where the gases to be internally ducted through the jet deflector device are reheated in that the essential geared drives are arranged in the cold section upstream from the combustion section which begins at the flameholders 42 illustrated schematically in this FIG. 4.

The embodiment of FIG. 4 affords another advantage in that the cylindrical shroud 36 carrying components of the geared drive 19 (FIG. 2), of the differential gear 22 and the transmitting device 23, can be manufactured separately from the jet deflector device and can be detached from the tubular member 2 at the parting areas 43 and 44 for ease of assembly and maintenance.

In lieu of the direct engagement of the pinions 20, 33, 34 and 28 with the ring gears 21, 31, 32 and 29 shown on FIGS. 2 to 4, use can be made of chain and sprocket wheel drives for transmitting the input from the first actuator 17 and the second actuator 18 to the first and the second tubular members 2 and 3. FIG. 3A schematically illustrates a chain and sprocket drive arrangement with chains 20A, 33A, 34A and 28A. The primed reference numerals in this FIG. 3A correspond to similar parts referred to by corresponding non-primed reference numerals in FIG. 3. Sprocket wheel drives provide an advantage in that they do not impose the stringent requirements of accuracy in manufacture associated with the envisioned geared drives. Therefore, where thermal distortion causes slight deformations of the tubular members, these sprocket wheel drives will not detract from the functional integrity of the device to the degree to be expected when pinions engage directly with ring gears attached to the tubular members. Also, when chains are used for power transfer, any play devloping in the transmission system can be rectified with comparative ease by retensioning the chains. The chain and sprocket connection could be constructed by separating the pinions out of engagement with respective associated ring gears and then placing a driving chain around the pinion and ring gears such that the pinion and ring gears are inside of a closed loop formed by the chain.

Figure 5:
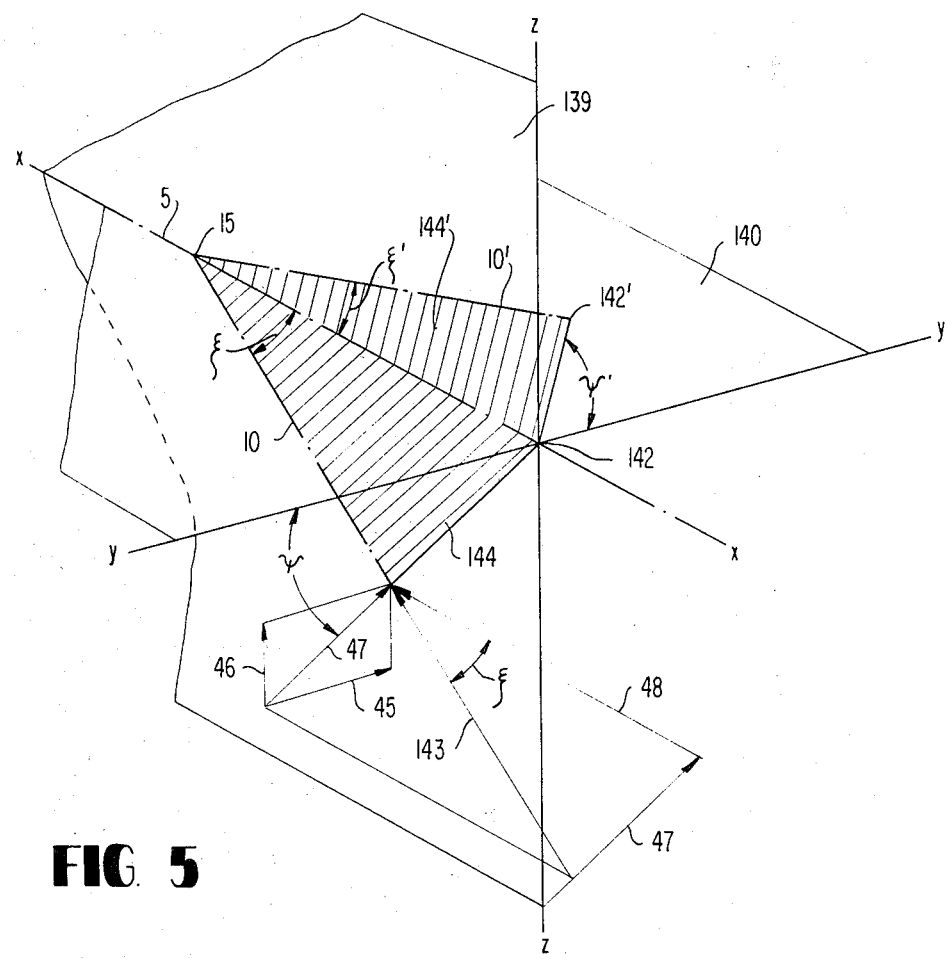
FIG. 5 is a diagram illustrating the operation of the jet deflector device of FIGS. 2, 3 and 4.

FIG. 5 is a perspective view illustrating the effect in practice of the device of FIGS. 1 to 4 assembled in accordance with this invention. Shown thereon is a vertical plane 139 and a horizontal plane 140 intersecting one another in the axis $x — x$. Let the axis $x — x$ be the aircraft longitudinal centerline and coincide with the produced engine centerline 5 (FIGS. 1 to 4).

Let the common point of intersection 142 of the coordinate axes $2—z$, $y—y$ in the aircraft longitudinal centerline $x—x$ assigned to the planes 139, 140 simultaneously form the center of the thrust nozzle 4 (FIGS. 1 to 4) when the jet deflection device formed by the tubular members 2 and 3 is in the solidly drawn extreme position for cruise flight.

Similar relative rotation of the tubular members 2 and 3 will then deflect the longitudinal centerline 10 of the tubular member 3 away from the center 15 (FIG. 1) of the rotary bearing 7 so that the gas jet issuing from the engine is vectored in a laterally aft and down direction. The resulting thrust component is indicated with the numeral 143. The position of the longitudinal centerline 10 common to the jet pipe 3 and the thrust nozzle 4 therefore relates on the one hand to the angle $\psi$ between the transverse center plane 140 and the plane 144 formed by the produced engine centerline 5 and the longitudinal centerline 10, and on the other hand to the true deflection angle $\xi$ between the longitudinal centerline 10 and the produced engine centerline 5.

The angles $\psi$ and $\xi$ therefore are arbitrarily variable reference magnitudes for three-dimensionally arbitrarily variable positions of the longitudinal centerline 10 and so for three-dimensionally arbitrarily variable directions of the jet exhausting from the nozzle 4, which is here exemplified by the positions 10′, 142′, 144′ and the angles $\psi'$ and $\xi'$. The thrust component 143 resulting from the position 10 of the longitudinal centerline common to the jet pipe 3 and the thrust nozzle 4 is resolved with the triangles of forces indicated in the drawing into the control force 47 formed by the horizontal and vertical control forces 45, 46 acting on the aircraft tail, and the residual engine thrust 48 acting in parallel to the produced engine centerline 5.

The angle $\psi$ can therefore alternatively be defined as the angle between the resultant control force 47 formed by the horizontal and vertical control forces 45, 46 and the transverse center plane 140 of the aircraft, while the angle $\xi$ can alternatively be defined as the angle included between the components formed by the residual engine thrust 48 and the resultant engine thrust 143.

For a given engine configuration, the angles $\psi$ and $\xi$ can be calculated for each angular position of the thrust nozzle. The angles $\psi$ and $\xi$ or the corresponding desired angular position of nozzle 4 can be fed by signals into an electronic computer 48 (FIG. 2) which will then use them to compute the desired angles of rotation

*a* and *b* (FIG. 6) and the rotational directions F, G (FIG. 6) of the tubular members 2 and 3 to be conveyed in the shape of impulses via lines 49, 50 and the positioning elements 49', 50' (FIG. 2) or restoring elements to the actuators 17, 18 (FIGS. 2 to 4). Also, control forces experienced by the aircraft tail section or other structure could be fed to the computer if desired, for effecting an automatic control of the angular position of the nozzle in response to said forces. Also various autopilot systems could be used in conjunction with this invention for controlling the actuators 17 and 18. Since computer arrangements for carrying out the above described functions for computer 48 are of known specific construction, a detailed description is not included herein. Also, positioning elements of known construction, for example servomotors responsive to electrical inputs from the computer could be utilized for directly controlling the actuators 17 and 18.

A mechanical control device can also be substituted for the electronic control device 48. The positioning magnitudes, say $\psi$ and $\xi$, as a function of a given jet deflector angle, are transformed via linkage and three-dimensional cams into directions of motion such that the actuators 17, 18, via the restoring elements 49', 50', can be caused to impress on the tubular members 2 and 3 the selected angles and directions of rotation.

Figure 6:
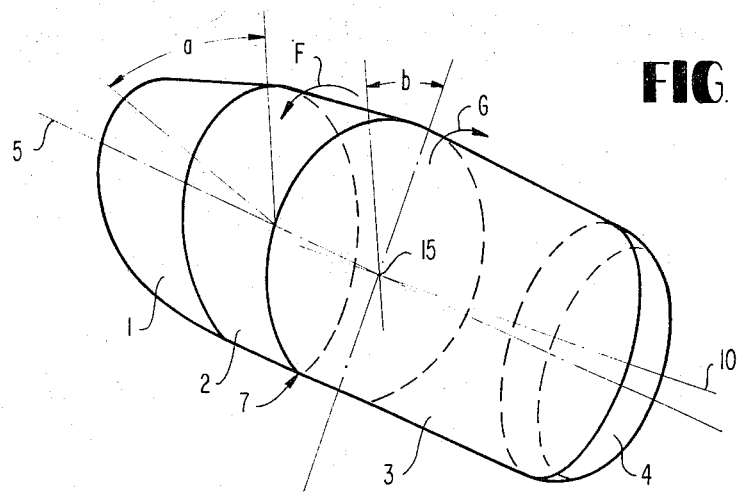
FIG. 6 is a further representation of a jet deflector device in illustration of its operation.

FIG. 6 shows the jet deflector device in an extreme position intended to deflect the longitudinal centerline 10 common to the tubular member 3 and the thrust nozzle 4 in a slightly lateral aft and down direction away from the produced engine centerline 5 by rotating the tubular members 2, 3 in the directions indicated on the drawing by arrows F, G through different degrees of arc. It is evident from the drawing that the rotational angle "*a*" traversed by the tubular member 2 can be, for the example illustrated, nearly twice the size of angle "*b*" of the tubular member 3.

While I have shown and described only several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A jet deflector arrangement for use on a jet engine or the like having a relatively fixed inlet pipe with gases flowing therethrough; said arrangement comprising: first and second tubular members in communication with the gases in said inlet pipe, one end of said first tubular member being rotatably attached to the downstream end of said inlet pipe for rotation about an axis extending perpendicularly to a first bearing plane, the other end of said first tubular member being rotatably attached to the upstream end of said second tubular member for rotation about an axis extending perpendicularly to a second bearing plane, the downstream end of said second tubular member being constructed as an exhaust nozzle for discharging the gases passing therethrough, said first and second bearing planes being angularly inclined with respect to one another such that relative rotation of said first and second tubular members causes a deflection of the centerline of said second tubular member with respect to the centerline of said inlet pipe, first actuating means for imparting relative rotational movement between said inlet pipe and said first tubular members, second actuating means for imparting relative rotational movement between said first tubular member and said second tubular member, and transmitting means for operatively connecting said first and second actuating means such that the rotation of said first tubular member with respect to said inlet pipe can be carried out independently of rotation of said second tubular member with respect to said first tubular member, wherein an annular carrier is rotatably mounted at the circumference of the first tubular member, said carrier having first and second ring gears formed along the circumference thereof, wherein first driving means drivingly connect an output shaft of said second actuator forming part of said second actuating means with said first ring gear, wherein rotative connection means are arranged between said second ring gear and said second tubular member for drivingly connecting said second ring gear with said second tubular member, said rotative connection means including second driving means in direct driving engagement with said second ring gear, and wherein the transmission ratio between the output shaft of the second actuator and the first ring gear is the same as the transmission ratio between the second ring gear and the rotative connection means, whereby stoppage of the output shaft of said second actuator precludes relative rotation of said first and second tubular members during rotation of said first member.

2. An arrangement according to claim 1, characterized in that said first attachment plane extends perpendicularly to the centerline of the inlet pipe.

3. An arrangement according to claim 1, characterized in that said first and second driving means include pinions directly engaging teeth of the respective first and second ring gear means.

4. An arrangement according to claim 1, characterized in that said first and second driving means include chain and wheel sprocket arrangements with respective chain links directly engaging teeth of the respective first and second ring gear means.

5. An arrangement according to claim 1, wherein a third ring gear is rotatably fixed to the circumference of said first tubular member and third driving means are attached to an output shaft of a first actuator forming part of said first actuating means, said third driving means directly engaging said third ring gear.

6. An arrangement according to claim 1, wherein a fourth ring gear is rotatably fixed to the circumference of said second tubular member and fourth driving means are attached to an output shaft of said rotative connection means, said fourth driving means directly engaging said fourth ring gear.

7. An arrangement according to claim 5, wherein a fourth ring gear is rotatably fixed to the circumference of said second tubular member and fourth driving means are attached to an output shaft of said rotative connection means, said fourth driving means directly engaging said fourth ring gear.

8. An arrangement according to claim 7, characterized in that said first, second, third and fourth driving means all include pinions directly engaging teeth of the perspective associated ring gears.

9. An arrangement according to claim 7, characterized in that said first, second, third and fourth driving means all include chain and wheel sprocket arrangements with respective chain links directly engaging teeth of the respective associated ring gears.

10. An arrangement according to claim 1, characterized in that said rotative connection means includes universal joint means for accommodating relative pivotal movement of said first and second tubular members.

11. An arrangement according to claim 7, characterized in that said rotative connection means includes universal joint means for accommodating relative pivotal movement of said first and second tubular members.

12. An arrangement according to claim 8, characterized in that said rotative connection means includes universal joint means for accommodating relative pivotal movement of said first and second tubular members.

13. An arrangement according to claim 9, characterized in that said rotative connection means includes universal joint means for accommodating relative pivotal movement of said first and second tubular members.

14. An arrangement according to claim 6, wherein said rotative connecting means is attached to said first tubular member at a circumferential position corresponding to the shortest axial extent of said first tubular member.

15. An arrangement according to claim 1, wherein said first tubular member is constructed at its upstream end in the shape of a substantially cylindrical shroud, said shroud being rotatably supported at the circumference of the inlet pipe, and wherein the carrier is rotatably supported at the circumference of said shroud.

16. An arrangement according to claim 15, wherein bearing support means for parts of the rotative connection means is fixed to said shroud.

17. An arrangement according to claim 15, wherein said shroud is constructed to be separately disengageable from said first tubular means.

18. An arrangement according to claim 5, wherein said first tubular member is constructed at its upstream end in the shape of a substantially cylindrical shroud, said shroud being rotatably supported at the circumference of the inlet pipe, and wherein the carrier is rotatably supported at the circumference of said shroud.

19. An arrangement according to claim 18, wherein said third ring gear is fixedly mounted on said shroud.

20. An arrangement according to claim 15, wherein said shroud is supported by ball bearings on the surface of the inlet pipe.

21. An arrangement according to claim 15, wherein flame holder means are mounted in said inlet pipe in the area circumscribed by said shroud.

22. An arrangement according to claim 1, wherein flame holder means are provided in said inlet pipe.

23. An arrangement according to claim 1, wherein said rotative connecting means is attached to said first tubular member at a circumferential position corresponding to the longest axial extent of said first tubular member.

24. An arrangement according to claim 1, wherein said rotative connecting means is attached to said first tubular member at a circumferential position corresponding to the shortest axial extent of said first tubular member.

* * * * *